June 20, 1950
E. B. HUFF
2,511,918
ELECTRIC TESTING DEVICE
Filed Sept. 20, 1946
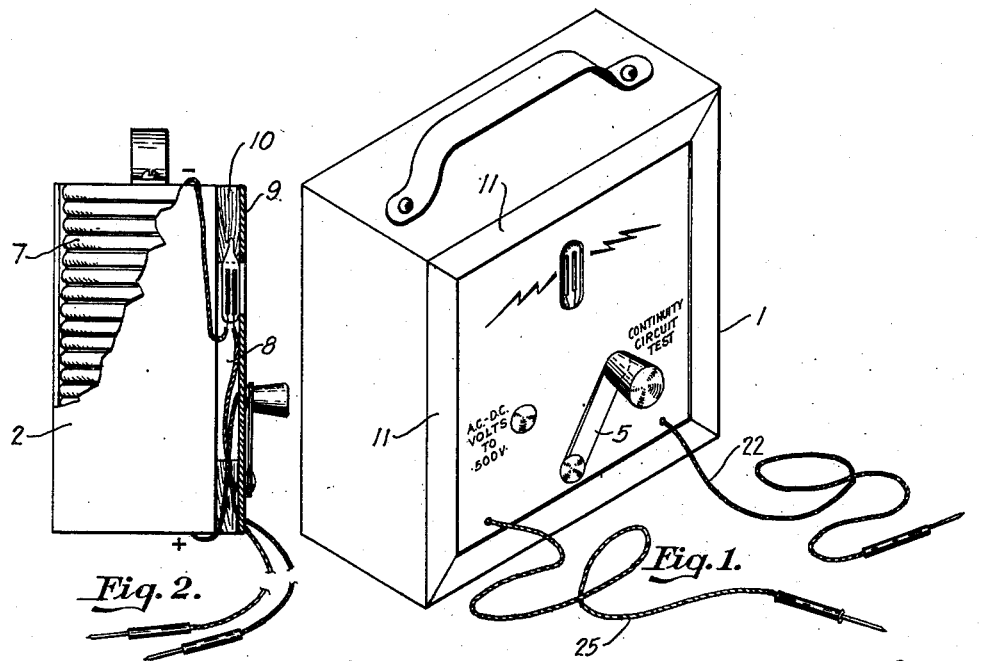
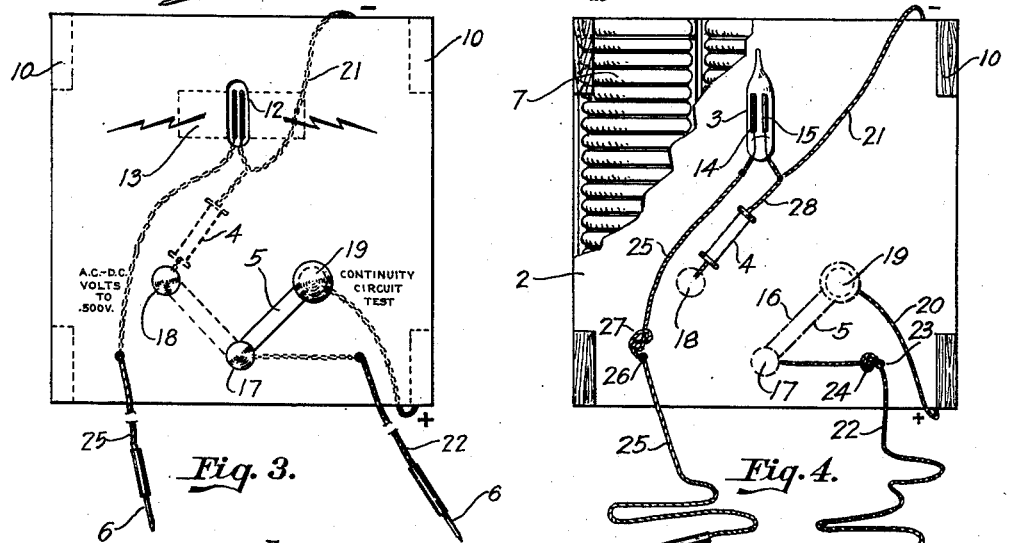
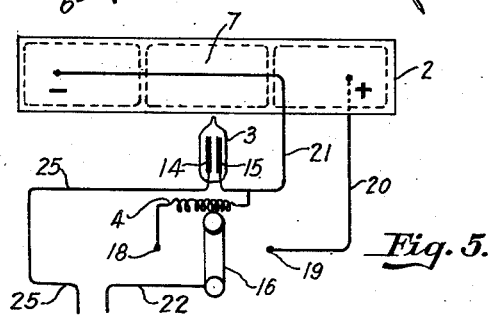
INVENTOR.
Everett B. Huff
BY
A. Schapp
ATTORNEY Patented June 20, 1950

2,511,918

UNITED STATES PATENT OFFICE 2,511,918

ELECTRIC TESTING DEVICE

Everett B. Huff, San Francisco, Calif.

Application September 20, 1946, Serial No. 698,353

1 Claim. (Cl. 175—183)

The present invention relates to improvements in electric testing devices, and its principal object is to provide a testing device that is simple in construction, portable, may be manufactured at small expense, has no movable parts except for an operating switch and is particularly adapted for use by the mechanic or trouble-shooter in general repair work and in the examination of radio apparatus, motor vehicles and other electrical devices.

More particularly, it is proposed to utilize a neon light as an indicating means, the light indicating by its intensity the amount of current passing therethrough, and also being adapted to indicate whether the current is direct or alternating and the direction of flow.

It is further proposed to use a high voltage battery of simple construction for testing continuity of a circuit.

It is a further object of my invention to utilize a high resistance whereby voltages up to 500 volts may be tested in connection with a small, low amperage neon light.

Another object of the invention is to provide electrical connections and a switch whereby the neon light may be used to test both voltages and continuity of circuit.

And finally, it is proposed to combine the battery, the neon light, the resistance, the switch and the electrical connections into a simple, portable unit which may be readily carried from place to place and conveniently positioned for testing purposes wherever the work happens to be.

Further objects and advantages of the invention will appear as the specification proceeds and the new and useful features of my device will be fully defined in the claim hereto attached.

The preferred form of my invention is illustrated in the accompanying drawing, forming part of this application, in which:

Figure 1 shows a perspective view of my testing device;

Figure 2, a side elevation thereof, with the near side wall removed to disclose the interior;

Figure 3, a front view of the testing device;

Figure 4, a section taken immediately behind the front wall; and

Figure 5, a wiring diagram.

While I have shown only the preferred form of my invention, it should be understood that various changes or modifications may be made within the scope of the claim hereto attached without departing from the spirit of the invention.

Referring to the drawing in detail, my testing unit is enclosed in a rectangular casing 1 and comprises in its principal features, a battery 2, a neon light bulb 3, a resistance 4, a switch 5 and electrical connections for the different parts including a pair of test leads 6.

The battery 2 consists of a series of dry cells 7 of the flat commercial type, the cells being arranged in three stacks of equal height and positioned alongside of one another to form a rectangular solid block which snugly fits in the rear of the casing 1 and occupies the major portion of the latter. Only a narrow space 8 is left between the battery block and the face or front plate 9, the spacing being effected by means of cleats 10.

The face plate 9 may be held in place by flanges 11 projecting over the same from the side walls and the top and bottom of the casing.

The face plate is formed with a vertical slot 12, centrally located in the upper portion of the plate, and has a small neon light bulb 3 mounted behind the slot, the bulb being held to the plate by any suitable means, as by an adhesive tape 13. The bulb is slightly larger than the slot, has two spaced electrodes 14 and 15, and may have a rating of one-twenty-fifth of a watt.

The face plate also carries a switch 5, which comprises a switch arm 16 pivoted in the plate, as at 17, and swingable over the front face of the plate for establishing electrical connection with either of the contacts 18 and 19.

The contact 19 is connected to the positive side of the battery by a wire 20, and the electrode 15 is connected to the negative side of the battery by a wire 21. A test lead wire 22 is connected to the pivot 17 and extends through a hole 23 in the front plate, outward pull on the wire being limited by a knot 24.

The electrode 14 is connected to the second test lead wire through a wire 25, which passes through a hole 26 in the front plate, outward pull being limited by a knot 27.

This completes the continuity test circuit. With the switch in the right-hand position indicated and the test leads 6 engaged over a conductive object, a current will flow from the positive of the battery through contact 19, the switch arm 16, the pivot 17, the two test wires 22—25, and the interposed object and the electrodes 14—15 to the negative side of the battery.

Since a direct current is involved, only one of the filaments, namely, filament 15 connected to the negative side of the battery, will light, and the intensity of the light will indicate the amount of resistance offered by the test object.

If, for instance, the two test leads 6 are brought into direct contact with one another, the glare will be bright and will extend through the full length of the electrode. If considerable resistance is interposed, as for instance, the human body, by holding one test lead in one hand and one in the other, the glare will be dim and extend only about one-half way up the electrode.

With a little experimenting on resistances of known values, a mechanic will soon acquire the faculty of judging, by the intensity and extent of the glare, the approximate resistance of the test object.

In the same manner he may test, of course, insulation and leaks in insulation. If the test object is an insulator, like a distributor cap, and the latter is in good condition, no light should show in the neon tube. If there are leaks between the points of contact, the electrode will indicate this by a glow the intensity of which depends upon the character of the leak.

The filament 15 is also connected, through wire 28 and the resistance 4, with the switch contact 18. This resistance is very high, preferably one-tenth of a megohm, to render the device operable for testing relative high voltages, up to approximately 500 volts.

When the switch is thrown over to the left and the leads are engaged over a source of energy, a circuit will be completed through the lead wire 22, the pivot 17, the switch arm 16, contact 18, resistance 4, wire 28, electrodes 15—14 and lead wire 25.

If the source of energy produces alternating current, both filaments will light up, and the intensity of the glow will indicate the approximate voltage of the source.

If the source of energy produces a direct current, only one of the electrodes will light up, and the operator may thus determine the positive and negative sides of the source, and also, again, by the intensity of the glare, the approximate voltage of the source.

It will be seen that this testing device can serve many uses, is extremely simple in construction, can be manufactured at a small cost, and may be readily carried from place to place for convenient positioning in the vicinity of the work.

I claim:

In an electrical testing device of the character described, a portable rectangular casing having a rear wall, side walls and a face plate covering the front end thereof, a high voltage battery comprising a series of stacks of flat dry cells arranged in adjacent relation to form a compact rectangular block mounted in the casing and snugly fitted against the rear wall and the side walls, and made to occupy the major portion of the casing so as to leave only a narrow space between the battery and the face plate, a neon light bulb having spaced electrodes and a resistance mounted in said narrow space, the face plate having a slot through which the neon light bulb may be inspected, a pair of test leads extending outside the casing, and electrical connections operable for connecting either the battery or the resistance in series with the electrodes and the test leads.

EVERETT B. HUFF.

REFERENCES CITED

The following references are of record in the file of this patent:

UNITED STATES PATENTS

| Number | Name | Date |
|---|---|---|
| 956,867 | Beattie | May 3, 1910 |
| 1,528,709 | Trimble | Mar. 3, 1925 |
| 1,736,605 | Kreft | Nov. 19, 1929 |
| 1,835,882 | Krippner | Dec. 8, 1931 |
| 2,156,319 | Steele | May 2, 1939 |
| 2,290,760 | Mehaffie | July 21, 1942 |
| 2,413,484 | Berger | Dec. 31, 1946 |